Patented Aug. 14, 1951

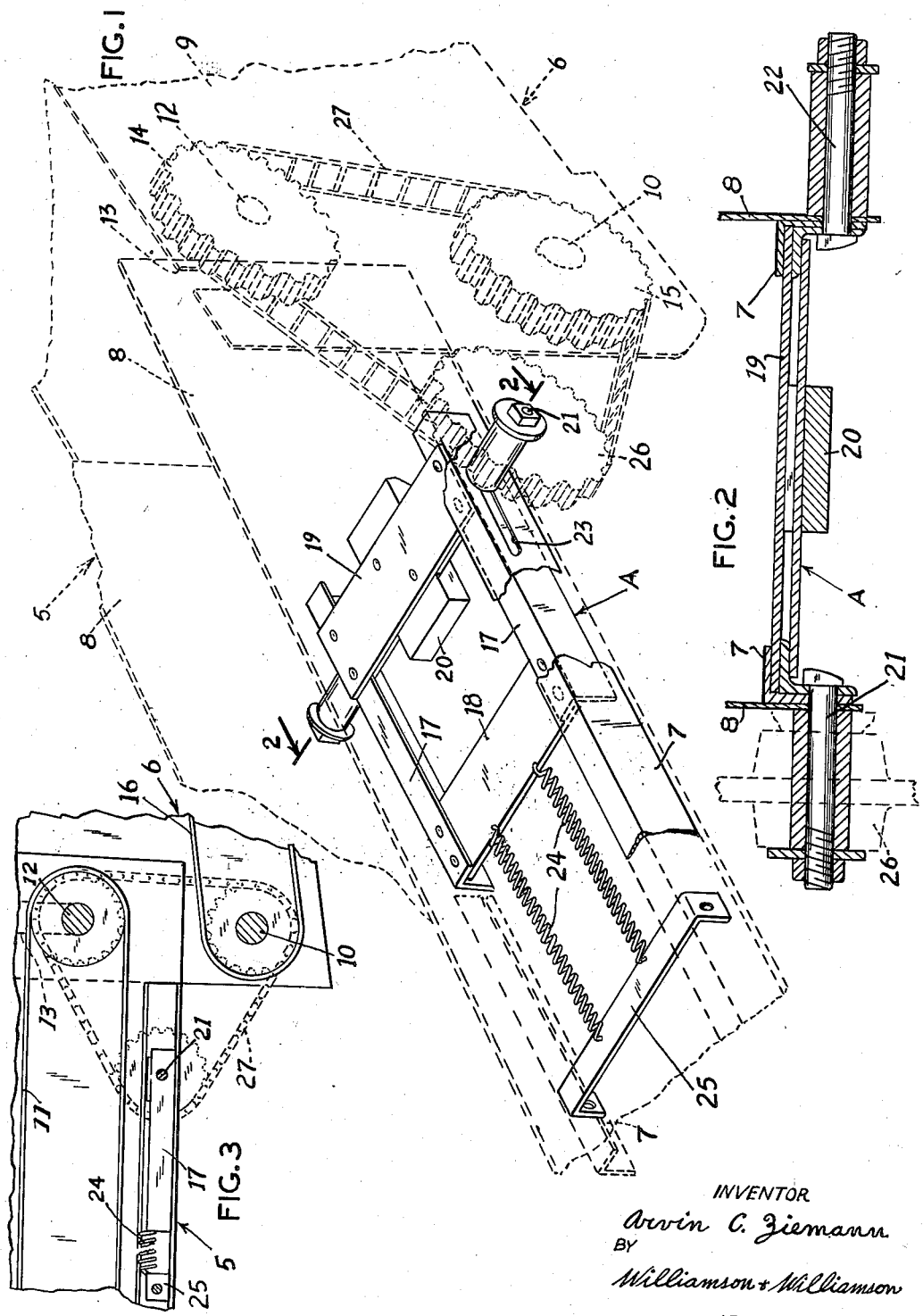

2,564,090

UNITED STATES PATENT OFFICE 2,564,090

CONVEYER DRIVE TENSIONER

Arvin C. Ziemann, Fairmont, Minn.

Application January 22, 1949, Serial No. 72,234

4 Claims. (Cl. 198—92)

This invention relates to devices for maintaining a substantially predetermined tension in driving belts and the like.

It is an object of my invention to provide a novel and improved tensioning device for flexible driving connections particularly adapted for use with multiple section hingedly interconnected conveyors which are adapted to transmit the driving power from one section to the other.

It is another object to provide an attachment for multiple section hingedly interconnected conveyors whereby the driving mechanisms between the sections of said conveyors may be positively interconnected to transfer the driving power from one section to the other regardless of the angular relation therebetween.

These and other objects and advantages of my invention will more fully appear from the following description made in connection with the accompanying drawings wherein like reference characters refer to similar parts throughout the several views and in which:

Fig. 1 is a perspective view showing my attachment in full lines and the hinged conveyors and frame structure partially in full lines and partially in dotted lines;

Fig. 2 is a transverse vertical sectional view taken substantially along the line 2—2 of Fig. 1; and Fig. 3 is a vertical sectional view taken adjacent the side of said hingedly interconnected conveyors and showing the driving connection pinions in dotted lines.

As illustrated in the accompanying drawings, I show a pair of hingedly interconnected conveyors 5 and 6. The conveyor 5 has a pair of longitudinal angles 7 forming the lower frame members thereof. A pair of upstanding sides 8 are respectively fixed to said frame members 7 and extend upwardly therealong. The conveyor 6 has side members 9 which are fixed to suitable frame members (not shown) and have a rotary drive shaft 10 journaled in the lower portions thereof. The conveyor 5 has an endless conveyor belt 11 trained about a suitable pulley structure which is fixed to a shaft 12 journaled in the sides 8 at the upper portions thereof and extending laterally outwardly beyond said sides. The conveyor belt 11 is driven at its other end (not shown) by any suitable source of rotary power, and the shaft 12 is driven by said belt 11. The conveyor 5 is slightly narrower than the conveyor 6, and the sides 8 of conveyor 5 are adapted to be received between the sides 9 of conveyor 6, as shown in the accompanying drawings.

The sides 9 of conveyor 6 have a pair of opposed open-topped slots 13 respectively formed in the upper portions thereof and are adapted to receive the outwardly extending portions of shaft 12. A pinion 14 is fixed at one end of said shaft 12 to be driven thereby and is disposed in slightly spaced relation to the adjacent portion of side 8. The shaft 10 of conveyor 6 extends outwardly beyond the sides 9 thereof and has a pinion 15 fixed to one outstanding end portion thereof on the same side as pinion 14. The conveyor 6 has a conveyor belt 16 trained about a suitable pulley structure which is fixed thereto (not shown), and when the two conveyors are joined with the outwardly extending portions of shaft 12 inserted into slots 13 and sides 8 received between sides 9, the end portion of belt 11 overlaps the adjacent end portion of belt 16.

A carriage designated as an entirety by the letter A is slidably mounted under the angle 7, as best shown in Figs. 1 and 2, and said carriage A consists in a pair of longitudinal angles 17 rigidly interconnected by the cross bars 18 and 19, the cross bar 19 comprising a plurality of rigidly interconnected members, as best shown in Fig. 2. A longitudinal bar 20 is fixed to the underside of cross bars 19, and a pair of stub shafts 21 and 22 are fixed respectively to the side angles 17 below the cross bars 19 and extend outwardly therefrom. A pair of elongated slots 23 are respectively formed in opposed portions of angles 7 and sides 8 to permit said stub shafts 21 and 22 to extend therethrough and to permit the carriage A to slide longitudinally of conveyor 5 while at the same time supporting said carriage. A pair of springs 24 are connected to the rear cross bar 18, as best shown in Fig. 1, and an anchor bar 25 is fixed to the angles 7 in rearwardly spaced relation from said cross bar 18 to anchor the rear ends of said springs 24 and maintain tension therein. A pinion 26 is journaled on shaft 21, and a drive chain 27 is trained around the pinions 14, 15, and 26 to form a positive driving connection therebetween.

The following is a description of the operation of my device. The carriage A is mounted under the angle irons 7 of the conveyor frame, as described above, and the shafts 21 and 22 slidably support said carriage by extending through slots 23 formed in the angles 7 and sides 8 adjacent thereto, which slots permit limited shifting movement of the carriage longitudinally of the conveyor. When the angle between conveyor 5 and conveyor 6 is varied about shaft 12 as a pivot, the length of the chain 27 would ordinarily have to be varied also in conventional machines. However, with my improved device, a predetermined tension may be maintained in chain 27 regardless of the angular relation between the two conveyors 5 and 6 because the carriage A will shift to permit angular adjustment of the two conveyor sections 5 and 6. Also the shiftable carriage A with the idler pinion 26 mounted thereon permits quick and easy removal of the chain 27 to permit the two conveyors to be quickly dissembled and to also facilitate interconnecting the two conveyors without taking the chain 27 apart. The slidable carriage A shifts relative the conveyor 5 as the angular relation between the three pinions 14, 15, and 26 is varied and provides an extremely simple device for maintaining a substantially predetermined tension in the driving chain 27.

It will be seen that I have provided a highly efficient attachment for multiple section conveyors which are adapted to transmit the driving power from one conveyor section to the next section through a driving connection therebetween which will maintain a substantially predetermined tension in said driving connection and which will greatly facilitate and speed up assembling and dissembling of the sections of the conveyors.

It will, of course, be understood that various changes may be made in the form, details, arrangement and proportions of the parts without departing from the scope of my invention.

What I claim is:

1. A mechanism adapted to maintain a substantially predetermined tension in a flexible driving connection member interconnecting a rotary driving wheel of one conveyor section with the rotary driven wheel of another conveyor section, said mechanism comprising a carriage adapted to be mounted for longitudinal shifting movement on one of said conveyor sections, an idler wheel mounted on said carriage for shifting movement therewith and adapted to have the flexible driving connection of said conveyor sections trained therearound, and resilient means interconnecting said carriage and the section on which said carriage is mounted for urging said carriage away from said driving wheel and said driven wheel to maintain a substantially predetermined tension in the flexible connection member while compensating for variations in the angular relation between said conveyor sections.

2. Mechansim for maintaining driving connection between a pair of hingedly interconnected conveyor sections, said mechanism comprising a rotary driving wheel adapted to be connected to one of said conveyor sections, a rotary driven wheel adapted to be connected to the other section in spaced relation to said driving wheel, a carriage mounted for longitudinal shifting movement on one of said sections and having an outstanding spindle mounted transversely thereof and extending outwardly on at least one side thereof, a rotary idler wheel journaled on said spindle, a flexible driving connection member trained about said driving wheel, driven wheel and said idler wheel, and resilient means adapted to interconnect said shiftable carriage and said conveyor section on which said carriage is mounted to urge said carriage and said idler wheel away from said driving and driven wheels to maintain a substantially predetermined tension in the driving connection member while compensating for variations in the angular relation between said two conveyor sections.

3. The structure set forth in claim 2 and a pair of transversely disposed spindles mounted in laterally outstanding relation on opposite sides of said carriage to selectively receive said idler wheel and permit the driving connection to be selectively made on either side of said hingedly interconnected conveyor sections.

4. Mechanism for maintaining driving connection between a pair of hingedly interconnected conveyor sections, said mechanism comprising a carriage having a pair of laterally opposed elongated guiding members adapted to be received between the depending legs of a pair of angle irons of one of the conveyor sections, said angle irons having shaft-receiving slots formed therein, a pair of laterally extending shafts slidably mounted in said slots and respectively connected with said guides, a sprocket wheel journalled on either of said shafts for rotation on either side of said conveyor, and resilient means for normally urging said carriage toward an intermediate portion on said conveyor section.

ARVIN C. ZIEMANN.

REFERENCES CITED

The following references are of record in the file of this patent:

UNITED STATES PATENTS

| Number | Name | Date |
|---|---|---|
| 663,276 | Horine | Dec. 4, 1900 |
| 841,085 | Gilman | Jan. 8, 1907 |
| 1,948,168 | Edwards | Feb. 20, 1934 |

FOREIGN PATENTS

| Number | Country | Date |
|---|---|---|
| 424,504 | Great Britain | Feb. 22, 1935 |